United States Patent [19]
Hwang et al.

[11] Patent Number: 5,647,548
[45] Date of Patent: Jul. 15, 1997

[54] TENSION ARM DRIVING APPARATUS FOR VIDEO CASSETTE TAPE RECORDER

[75] Inventors: Haksun Hwang; Inki Cheon, both of Seoul; Sang Jig Lee, Kyungki-Do; Pohyoung Koh, Kyungki-Do; Hyeoksoo Park, Kyungki-Do; Sungwoo Choi, Kyungki-Do, all of Rep. of Korea

[73] Assignee: LG Electronics Inc., Seoul, Rep. of Korea

[21] Appl. No.: 559,483

[22] Filed: Nov. 15, 1995

[30] Foreign Application Priority Data

Nov. 15, 1994 [KR] Rep. of Korea .......... 29945/1994
Nov. 15, 1994 [KR] Rep. of Korea .......... 30198/1994

[51] Int. Cl.⁶ .......................................... G11B 15/44
[52] U.S. Cl. ............................. 242/338; 242/356.3
[58] Field of Search ...................... 242/338, 356.3, 242/356.4; 360/95, 96.3, 96.4

[56] References Cited

U.S. PATENT DOCUMENTS

| | | | |
|---|---|---|---|
| 4,173,320 | 11/1979 | Shatteman | 242/356.4 |
| 4,964,589 | 10/1990 | Okada | 242/356.4 |
| 5,159,506 | 10/1992 | Eino et al. | 360/95 |
| 5,230,483 | 7/1993 | Kang . | |
| 5,251,845 | 10/1993 | Ryu | 242/356.3 |
| 5,299,076 | 3/1994 | Park | 360/95 |
| 5,335,877 | 8/1994 | Sawai et al. | 242/334.6 |
| 5,501,408 | 3/1996 | Kang et al. | 242/356.5 |

FOREIGN PATENT DOCUMENTS

| | | | |
|---|---|---|---|
| 59-152553 | 8/1984 | Japan | 242/356.3 |
| 4362557 | 5/1993 | Japan . | |

*Primary Examiner*—John P. Darling

[57] ABSTRACT

An improved tension arm driving apparatus for a video cassette tape recorder capable of achieving a stable tape running state by preventing a tape jog in a high speed tape rewinding mode, includes a loading gear member for winding a tape around a head drum, and a high speed winding member for rotating upper and lower gears at the same time in cooperation with the loading gear member, so that the upper and lower gears integrally rotate in the high speed winding mode and tape jogging is prevented during the high speed winding mode.

13 Claims, 6 Drawing Sheets

TENSION ARM DRIVING APPARATUS FOR VIDEO CASSETTE TAPE RECORDER

BACKGROUND OF THE INVENTION

1. Field of the Invention

The present invention relates to a tension arm driving apparatus for a video cassette tape recorder, and particularly to an improved tension arm driving apparatus for a video cassette tape recorder capable of achieving a stable running state of a tape by preventing a tape jog in a high speed tape rewinding mode.

2. Description of the Conventional Art

Figure 1:
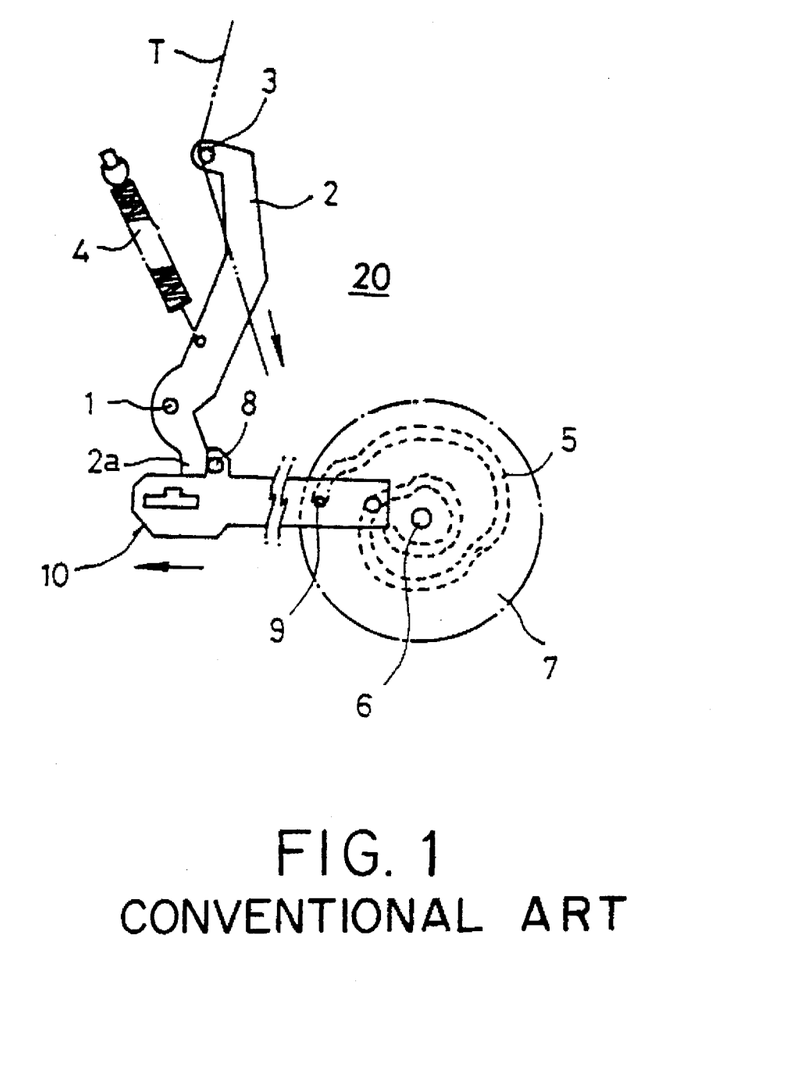
FIG. 1 is a plan view showing a tension arm driving apparatus of a conventional video cassette tape recorder.

Referring to FIG. 1, the conventional tension arm driving apparatus for a video cassette tape recorder includes a tension arm 2 rotatably engaged to a shaft pin 1 fixed to a predetermined portion of a main base 20, a tension post 3 fixed to an end of the tension arm 2, a tension spring 4 engaged to a predetermined portion of the tension arm 2 for elastically supporting the tension arm 2 in a certain direction, a cam gear 7 rotatably engaged to the shaft pin 6 and spaced apart from the tension arm 2 in cooperation with a cam groove 5, and an operation plate 10 linearly reciprocating above the main base 20 in cooperation with the cam pin engaged to an engaging pin 8 contacting with one end 2a of the tension arm 2 and the cam groove 5.

The operation of the conventional tension arm driving apparatus for a video cassette tape recorder will now be explained.

To begin with, when the cam gear 7 rotates, since the cam pin 9 of the operation plate 10 is inserted into the cam groove 5 formed on a predetermined portion of the cam gear 7, the operation plate 10, as shown in FIG. 1, moves either in the rightward or leftward direction and drives the tension arm 2.

For example, when the operation plate 10 moves in the leftward direction, as indicated by the arrow as shown in FIG. 1, since the end 2a of the tension and 2 engages with the engaging pin 8 of the operation plate 10, the tension arm 2 is moved by the elastic force of the tension spring 4 and rotates in the clockwise direction about the shaft pin 1.

However, on the contrary, when the operation plate 10 moves in the rightward direction, the tension arm 2 rotates counterclockwise about the shaft pin 1 by the recovering force of the tension spring 4 about the shaft pin 1.

The tension post 3 fixed to the tension arm 2 guides the running operation of a tape T in accordance with the rotation operation of the tension arm 2. In case of using a 8 mm cameorder tape damage occurs due to shape of the cassette while the tape T is conveyed therein without a certain loading therein, due to the shape of the cassette. So, as shown in FIG. 1, the tape T is conveyed in a state where the tape T is presented therein.

However, the conventional tension arm driving apparatus for a video cassette tape recorder has disadvantages in that since the tension arm moves in only one direction by the engaging pin of the operation plate, the tension arm becomes jogged in the tape rewinding mode by the tension force of a running tape, so that the running state of the tape becomes unstable. In particular, in case of using a 8 mm tape, malfunction may occur in the system because the tape comes off from its running path.

SUMMARY OF THE INVENTION

Accordingly, it is an object of the present invention to provide a tension arm driving apparatus for a video cassette tape recorder, which overcomes the above and other problems encountered in the conventional tension arm driving apparatus for a video cassette tape recorder.

It is another object of the present invention to provide an improved tension arm driving apparatus for a video cassette tape recorder capable of achieving a stable tape running state by preventing a tape jog in a high speed tape rewinding mode.

To achieve the above and other objects, in accordance with an aspect of the present invention, there is provided a tension arm driving apparatus for a video cassette tape recorder, which includes a loading gear member for wining a tape around a head drum; and a high speed winding member for rotating the upper and lower gears at the same time in cooperation with the loading gear member, so that the upper and lower gears integrally rotate in a high speed rewinding mode.

To achieve the above and other objects, in accordance with another aspect of the present invention, there is provided a tension arm driving apparatus for a video cassette tape recorder, which includes a loading gear having a cam for winding a tape around a head drum; an intermediate lever having a pin contacting with the cam disposed on the loading gear and being in cooperation with the rotation of the loading gear; and a tension arm having a guide post contacting with the tape and disposed at one end thereof, and a guiding groove contacting with a guide pin of the intermediate lever and disposed at the other end thereof, whereby the intermediate lever guides the tension arm so that the tension arm does not jog in a high speed winding mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF PREFERRED EMBODIMENTS

Figure 2:
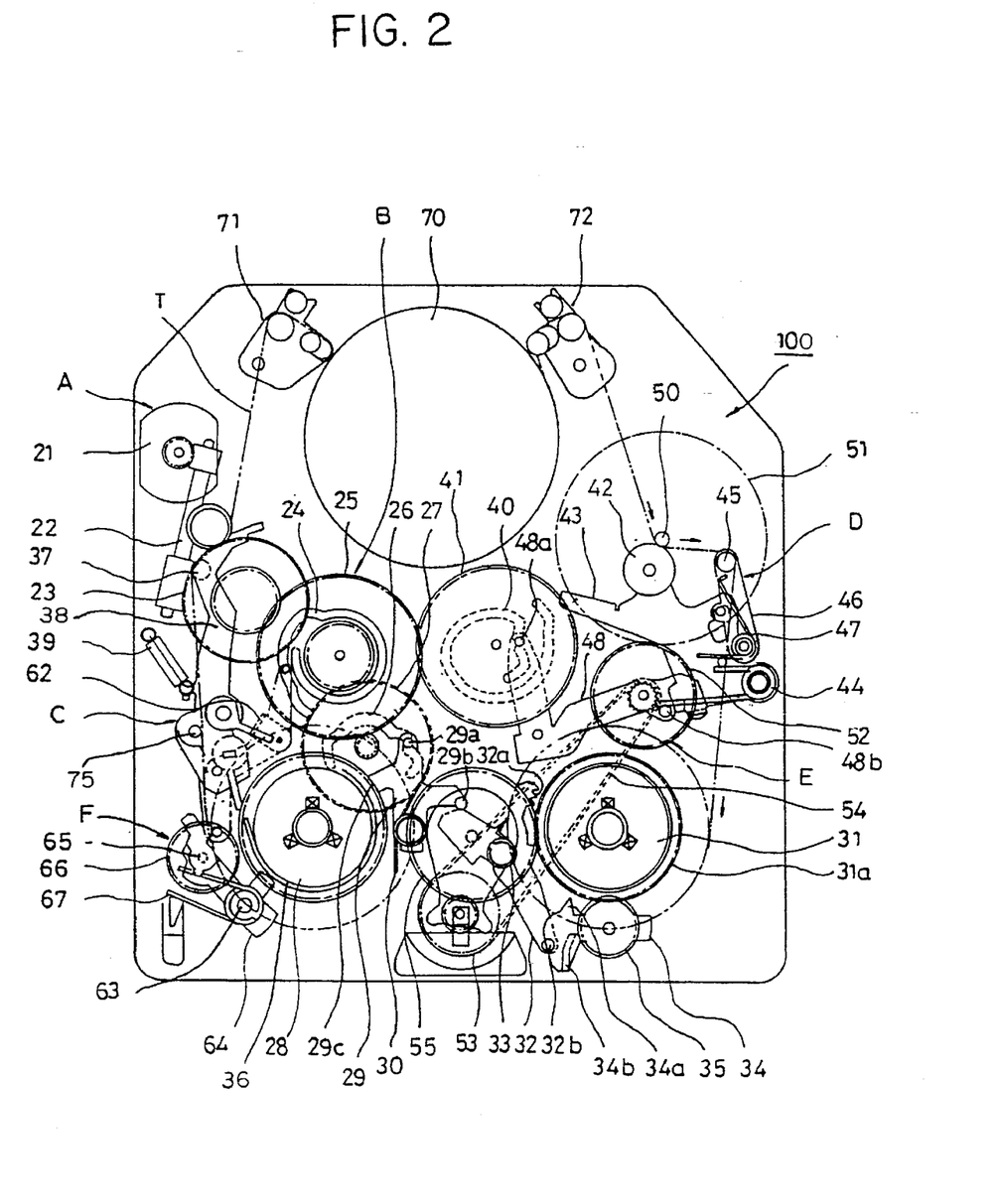
FIG. 2 is a plan view showing a tape running mechanism of a video cassette tape recorder in a reproducing mode according to the embodiments of the present invention.
Figure 3:
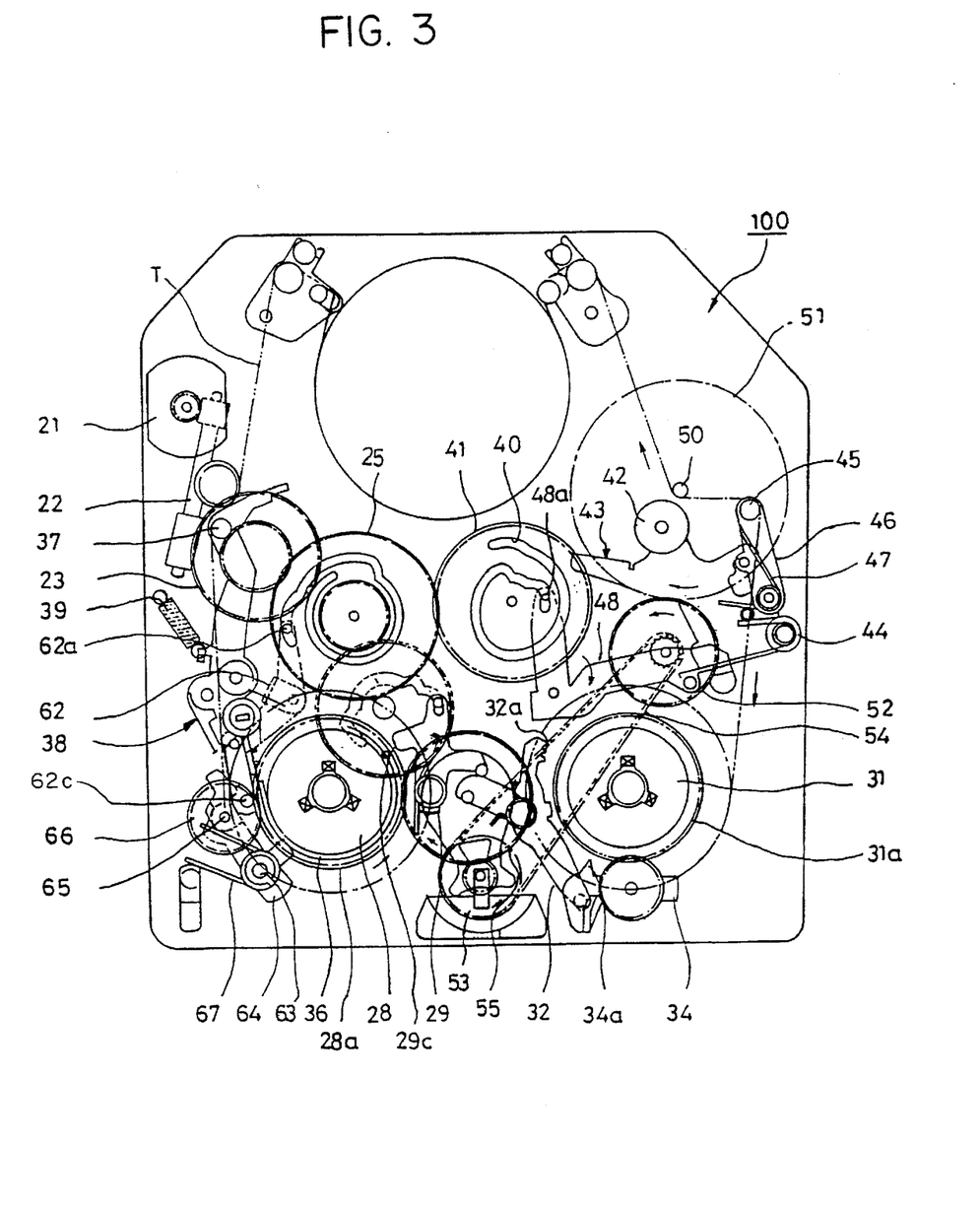
FIG. 3 is a plan view showing a tape running mechanism of a video cassette tape recorder in a high speed rewinding mode according to the present invention.

Referring to FIGS. 2 and 3, a tension arm driving apparatus for a video cassette tape recorder according to the embodiments of the present invention will now be explained.

To begin with, as shown therein, the tension arm driving apparatus includes a driving force transmitting member "A", a brake member "B", a tension arm driving member "C", a pinch arm and take-up guide driving member "D", a driving force transmitting member "E", and a high speed tape running guide member "F" for more stably guiding the running state of a tape in a high speed rewinding mode.

Figure 4:
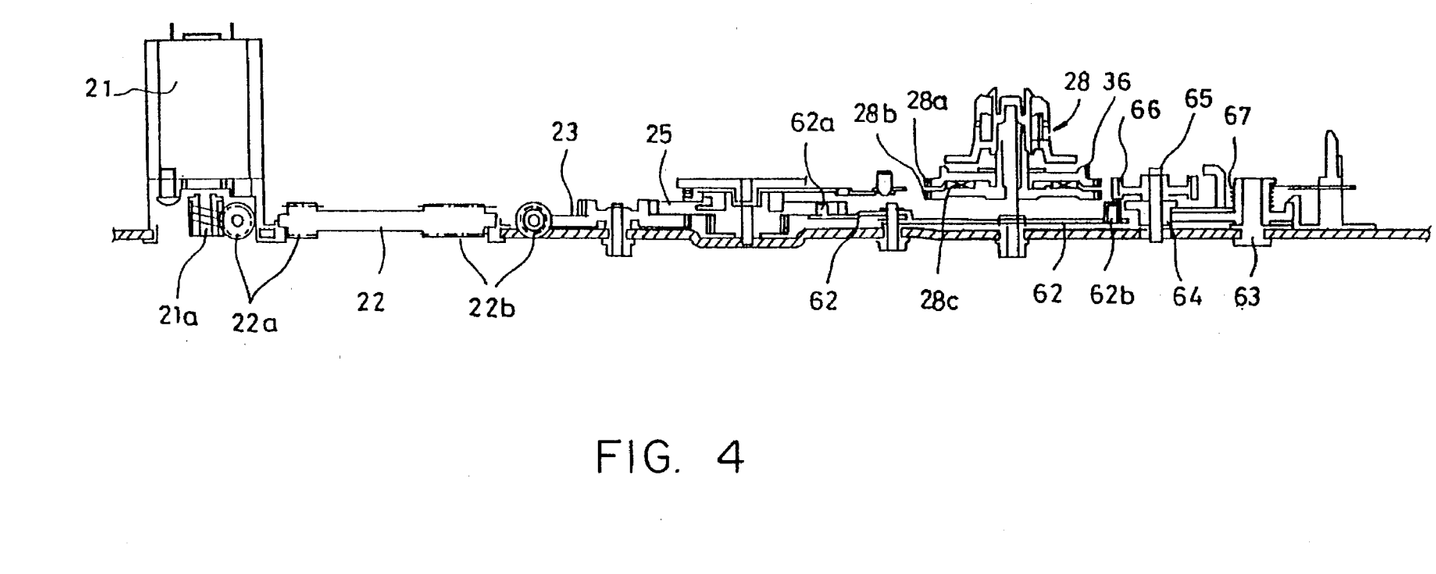
FIG. 4 is a cross-sectional view showing a tape running mechanism of a video cassette tape recorder according to the present invention.

The driving force transmitting member "A" includes a loading motor 21 disposed at a predetermined portion of the base plate 100, a driving force transmitting sub-member 22 for transmitting the driving force of the loading motor 21, and a connection gear 23 rotating in cooperation with the rotation force of the force transmitting sub-member 22. In addition, the loading motor 21, as shown in FIG. 4, is directed to transmitting a driving force to the driving force transmitting sub-member 22 and the connection gear 23, respectively, by providing a plurality of worm wheels 22a and 22b.

The brake member "B" includes a supply reel-side loading gear 25 rotating in cooperation with the rotation of the connection gear 23, a brake driving cam gear 27 formed on the cam groove 26 and rotating in cooperation with the rotation of the loading gear 25, a supply reel-side first brake 29 disposed near one side of a supply reel 28 and rotating in cooperation with the rotation of the cam gear 27, an elastic member 30 for elastically supporting the supply red-side first brake 29, a take-up reel side second brake 32 disposed near one side of a take-up reel 31 and rotating in cooperation with the movement of the supply reel-side first brake 29, an elastic member 33 for elastically supporting the take-up reel side second brake 32, a take-up reel side first brake 34 disposed near the other end of the take-up reel 31 and rotating in cooperation with the movement of the take-up reel- side second brake 32, and an intermediation gear 35 rotatably and coaxially engaged with the take-up reel side first brake 34 and drivingly engaged with a gear unit 31a of the take-up reel 31 for driving the take-up reel side first brake 34.

The supply reel-side first brake 29 includes a pressuring member 29c having a cam pin 29a inserted into the cam groove 26 of the cam gear 27 disposed at one end thereof, and an engaging pin 29b contacting with the supply reel-side second brake 32 and disposed at the other end thereof, and contacting with a tension band 36 wound around the outer circumferential surface of the supply reel 28 for supplying a predetermined force.

The supply red-side second brake 32 includes an engaging tooth 32a engaged with the gear unit 31a of the take-up reel 31 and disposed at one end thereof, and an engaging pin 32b disposed at the other end thereof.

The take-up reel-side first brake 34 includes an engaging protrusion 34a engaged with the gear unit 31a of the take-up reel 31 and disposed at one end thereof, and an engaging plate 34b contacting with the engaging pin 32b of the reel side second brake 32 and disposed at the other end thereof.

The tension arm driving member "C" includes a tension arm 38 having a tension post 37 fixed to one end thereof and disposed at a periphery of the supply reel 28, a tension spring 39 connected to the tension arm 38 for elastically supporting the tension arm 38, and a tension band 36 wound around the outer circumferential surface of the supply reel 28 and having both ends connected to the tension arm 38. In addition, the tension arm 38 is rotatably engaged to h shaft pin 75 fixed to a predetermined portion of the main base 100.

The pinch arm and take-up guide driving member "D" includes a take-up reel-side loading gear 41 having a cam groove 40 and being in cooperation with the rotation of the supply reel-side loading gear 25, a pinch arm 43 rotatably engaged with the pinch roller 42 and being near the take-up reel 31, an elastic member 44 rotatably engaged to a predetermined portion of a rotation center of the pinch arm 43 for elastically supporting the pinch arm 43, a take-up guide 46 rotatably engaged with the pinch arm 43 and having one end fixed to the take-up post 45, an elastic member 47 for elastically supporting the take-up guide 46, and an operation lever 48 rotatably engaged between the loading gear 41 and the pinch and 43 and having a cam pin 48a inserted into the cam groove 40 of the loading gear 41 and disposed at one end thereof and an engaging pin 48b disposed at the other end thereof for driving the elastic member 44 elastically supporting the pinch and 43.

The driving force transmitting member "E" includes a capstan motor 51 having a capstan shaft 50 which receives a predetermined force from the pinch roller 42, a driving pulley gear 52 rotating in accordance with a driving force of the capstan motor 51, a following pulley gear 53 disposed between the supply reel 28 and the take-up reel 31, a belt 54 disposed between the driving pulley gear 52 and the following pulley gear 53, and a gear 55 which is in cooperation with the rotation direction of the following pulley gear 53.

Meanwhile, the high speed running guide member "F" includes a tension arm 38, an intermediate lever 62 rotatably engaged to a shaft pin 61 and driven in cooperation with the supply reel-side loading gear 25, a rewinding gear 66 rotatably engaged to a shaft pin 65 and intermeshed with upper and lower gear units 28a and 28b of the supply reel 28, and an elastic member 67 engaged to a shaft pin 63 and elastically supporting the rewinding lever 64.

The intermediate lever 62 includes a cam pin 62a guided by and inserted into the cam groove 24 of the loading gear 25, a first engaging pin 62b contacting with the tension arm 38, and a second engaging pin 62c contacting with the rewinding lever 64. The cam groove 24 of the loading gear 25, as shown in FIG. 5, includes a small diameter member 24a, an intermediate diameter member 24b, and a big diameter member 24c.

Figure 5:
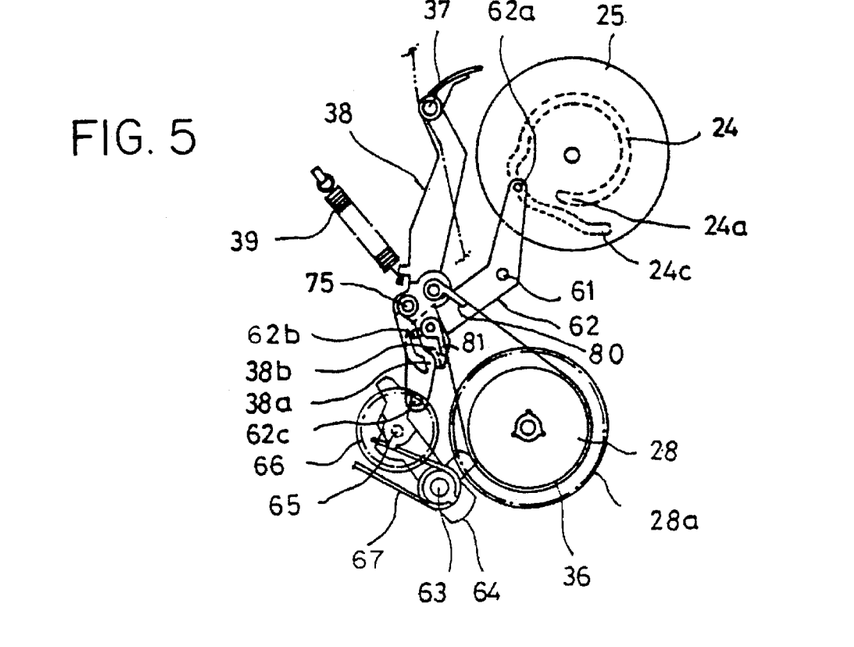
FIG. 5 is a plan view of a high speed running member of a tape running mechanism of a video cassette tape recorder in a reproducing mode according to the present invention.
Figure 8:
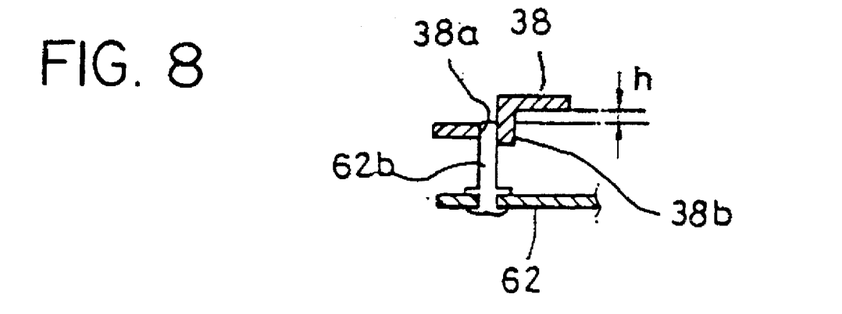
FIG. 8 is a cross-sectional view of FIG. 6 along line VIII—VIII.

The tension arm 38, as shown in FIGS. 5 and 8, includes a first opening 38a in which an engaging pin 62b of the intermediate level 62 is inserted, an engaging jaw 38b for limiting the movement of the engaging pin 62b at a predetermined portion of the first opening 38a, and a second opening 38c for allowing the movement of the engaging pin 62b at the inner portion of the engaging jaw 38b. That is, as shown in FIG. 8, the engaging pin 62b at the first opening 38a is not driven by a predetermined force of the engaging jaw 38b and spaced apart from the bottom surface of the tension arm 38 of the engaging jaw 38b, so that it is movable by the second opening 38c out of the engaging jaw 38b.

Band holders 80 and 81 are connected to a hinged portion of the tension arm 38, respectively, and a tension band 36 wound around the outer circumferential surface of the supply reel 28 is connected to the band holders 80 and 81.

Meanwhile, the supply reel 28 includes a friction member 28c between the upper gear 28a and the lower gear 28b, and the upper gear 28a is intermeshed with an idler gear 55 selectively connected to either the supple reel 28 or the take-up reel 31, the rotation force therefrom is transmitted to the supply reel 28 through the friction member and the lower gear 28b.

In the drawings, reference numeral 70 denotes the head drum, 71 and 72 denote supply reel-side and take-up reel-side slant post bases, respectively.

The operation of the tension arm driving apparatus for a video cassette tape recorder according to the present invention will now be explained.

To begin with, in a reproducing mode, a certain driving force of the loading motor 21 is transmitted to the driving force transmitting sub-member 22 and the connection gear 23 for rotating the supply reel-side and take-up reel-side loading gears 25 and 41, and the supply reel-side and take-up reel-side slant post bases 71 and 72 lead the tape T toward the head drum 70. At the same time, the tension arm 38 rotates, and the tape T has a predetermined tension force by the tension post 37.

That is, since the engaging pin 62b of the intermediate lever 62, rotating at a predetermined angle in a clockwise direction in accordance with a rotation of the loading gear, is positioned near the second opening 38c of the tension arm 38, the tension arm 38 becomes free from the intermediate lever 62. Therefore, as the tension arm 38 rotates counterclockwise by a recovering force of the tension spring 39, the tension post 37 leads the tape T toward the running position, and the tape T takes a predetermined tension force. At this time, as the cam gear 27 rotates in accordance with a rotation of the supply reel-side loading gear 25 and the supply reel-side first brake 29, having a cam pin 29a inserted into the cam groove 26 of the cam gear 27, rotates clockwise, and the pressuring member 29c detaches from the tension band 36, and the engaging pin 29b of the supply reel-side first brake 29 rotates the take-up reel-side second brake 32 counterclockwise and detaches from the gear unit 31a of the take-up reel 31, so that the take-up reel 31 becomes free from the rotation.

In addition, the take-up guide 46 rotates clockwise by a recovering force of the elastic member 47 elastically supporting the take-up guide 46 in accordance with a loading operation of the take-up reel slant post base 52, and the pinch arm 43 connected to the take-up guide 46 rotates clockwise.

Thereafter, the operation lever 48 rotates counterclockwise in which the cam pin 48a is inserted into the cam groove 40 of the loading gear 41 in accordance with a rotation of the take-up reel-side loading gear 41, the pinch arm 43 receives a predetermined rotation force in a counterclockwise direction in accordance with a certain force of the elastic member 44, the pinch roller 42 receives a predetermined force, and the tape T runs.

The tape T runs clockwise or counterclockwise in accordance with a rotation direction of the capstan shaft 50. At this time, the driving force of the capstan motor 51 is transferred to the idler gear 55 through the driving pulley gear 52, the belt 54, and the following pulley gear 53.

When the following pulley gear 53 rotates clockwise, the idler gear 55 rotates counterclockwise and becomes intermeshed with the gear unit 31a of the take-up reel 31. Then the idler gear 55 rotates the take-up reel 31, clockwise, having the same construction as the supply reel 28 and winds the tape T.

As the intermediate lever 62 rotates clockwise at a predetermined angle in a reproducing mode, the second engaging pin 62c fixed to one end thereof pushes the other end of the rewinding lever 64 to cause the rewinding lever 64 to rotate in a counterclockwise direction. Therefore, the rewinding gear 66 maintains a state where the rewinding gear 66 maintains a rewinding state from the upper and lower gear units 28a and 28b. At this time, the elastic member 67 maintains a compressed state.

Figure 6:
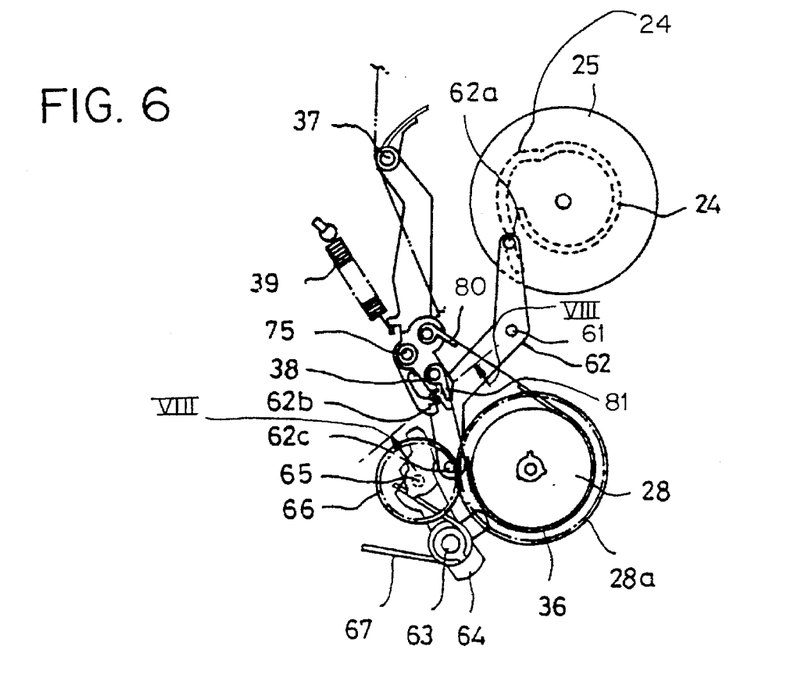
FIG. 6 is a plan view of a high speed running member of a tape running mechanism of a video cassette tape recorder in a high speed rewinding mode according to the present invention.
Figure 7:
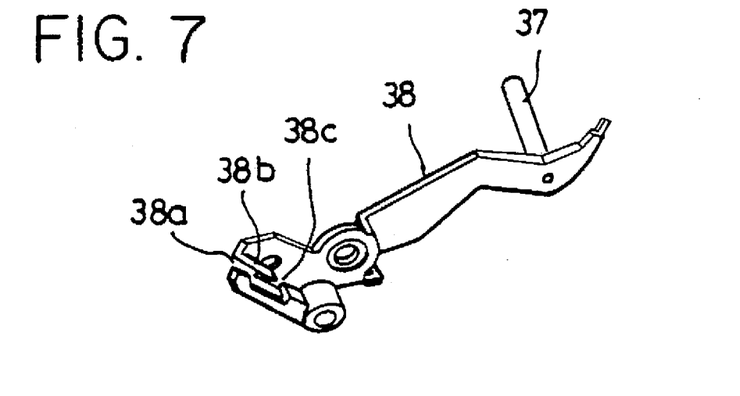
FIG. 7 is a perspective view of a tension arm of a tape running mechanism of a video cassette tape recorder according to the present invention.

Meanwhile, as shown in FIG. 3 and FIG. 6, at this time, in a state that the loading gear 25 rotated clockwise by the operation driving gear of the driving force of the loading motor 21, since the intermediate 62 rotates counterclockwise about the shaft pin 61, the tension arm 38 maintains a fixed-state. Therefore, since the tension arm 38 is rigidly engaged to the engaging pin 62b, the tension arm 38 maintains the fixed-state without jogging in the rightward and leftward directions.

At this time, the second engaging pin 62c moves in the rightward direction in accordance with a rotation operation of the intermediate lever 62, and the rewinding lever 64 rotates clockwise about the shaft pin 63 in accordance with a predetermined recovering force of the elastic member 67. The upper and lower gears 28a and 28b integrally rotate because the rewinding gear 66 is connected to the upper and lower gears 28a and 28b of the supply reel 28.

Therefore, the rotation force of the idler gear 55 is transferred to the upper gear 28a, and the rotation force rotates the supply reel 28 through the lower gear 28b, not through the friction member 28c.

In the rewinding mode, the pressuring member 29c of the supply reel-side first brake 29 is detached from the tension band 36 so as to free the rotation of the supply reel 28, and the engaging tooth 32a of the supply reel-side second brake 32 and the engaging protrusion 34a of the supply reel-side first brake 34 free the rotation of the take-up reel 31.

In addition, the operation lever 48 having a cam pin 48a inserted into the cam groove 40 of the take-up reel loading gear 41 rotates clockwise by a location change of the cam groove in accordance with a rotation of the loading gear, and the pinch arm 43 rotates counterclockwise by a recovering force of the elastic member 47. Then the pinch roller 42 comes off from the capstan shaft 50.

The capstan shaft 50 of the capstan motor 51 rotates, and the rotation force thereof is transferred to the idler gear 55 through the driving pulley gear 52, the belt 54, and the following pulley gear 53. Therefore, the idler gear 55 rotates clockwise and becomes intermeshed with the upper gear 28a of the supply reel 28, and the upper and lower gears 28a and 28b engaged with the rewinding gear 66 rotate counterclockwise, so that the tape winding operation can be achieved at a high speed without slip.

As described above, a tension and driving apparatus for a video cassette tape recorder according to the present invention is directed to providing an improved tension arm driving apparatus capable of more stably running by preventing a tape jog of a tension arm in a high speed rewinding mode. In addition, in case of using an 8 mm tape, the present invention prevents the tape from coming off out of its running path.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tension arm driving apparatus for a video cassette tape recorder including a reel having a slip mechanism in which the rotation force of an upper gear is transferred to a lower gear through a friction member, and a head drum, the apparatus comprising:

loading means for wrapping a tape around the head drum;

force transferring means for transferring force from said loading means;

high speed winding means, driven by said force transferring means, for rotating said upper and lower gears at the same time, so that the upper and lower gears integrally rotate in a high speed winding mode; and tension control means, controlled by said force transferring means, for controlling a tension arm and being locked in a predetermined position during the high speed winding mode.

2. The apparatus of claim 1, further comprising:

the tension arm having a guide post being disposed at one end thereof and contacting with the tape, and a guiding groove disposed at the other end thereof and contacting with a guide pin of an intermediate lever;

wherein said tension control means includes:

the intermediate lever for preventing jogging of the tension arm during the high speed winding mode.

3. The apparatus of claim 2, wherein said loading means includes a loading gear having a cam for wrapping the tape around head drum, the intermediate lever of the tension control means having a pin contacting with the cam of the loading gear.

4. The apparatus of claim 2, wherein the tension arm includes an engaging jaw for locking an engaging pin of the intermediate lever therein during the high speed winding mode.

5. The apparatus of claim 2, wherein the tension arm includes a first opening for receiving an engaging pin of the intermediate lever therein, an engaging jaw formed at one end of the first opening for limiting movement of said engaging pin, and a second opening formed at an inner side of the engaging jaw for enabling movement of said engaging pin.

6. The apparatus of claim 5, wherein the engaging pin of the intermediate lever is locked in the engaging jaw of the tension arm during the high speed winding mode.

7. The apparatus of claim 2, wherein said high speed winding means includes:

a high speed winding gear for intermeshing with the upper and lower gears and at the same time interacting with said intermediate lever in the high speed winding mode.

8. The apparatus of claim 7, wherein said winding gear is drivingly connected with a winding lever rotatably engaged with one side of a supply reel and is elastically supported by an elastic member.

9. A tension arm driving apparatus for a video cassette tape recorder, comprising:

a loading gear having a cam for wrapping a tape around a head drum;

an intermediate lever having a pin contacting with said cam disposed on said loading gear and being in cooperation with the rotation of the loading gear; and a tension arm having a guide post contacting with said tape and disposed at one end thereof and a guiding groove contacting with a guide pin of said intermediate lever and disposed at the other end thereof, whereby the intermediate lever guides said tension arm so that the tension arm does not jog in a high speed winding mode.

10. The apparatus of claim 9, wherein said tension arm includes a first opening in which an engaging pin of the intermediate lever is inserted, said first opening being formed on one end thereof, an engaging jaw formed at one end of said first opening for limiting movement of said engaging pin, and a second opening formed at the inner side of said engaging jaw for enabling movement of the engaging pin.

11. The apparatus of claim 10, wherein the engaging pin of the intermediate lever is locked in the engaging jaw of the tension arm during the high speed winding mode.

12. The apparatus of claim 9, further comprising:

a high speed winding gear for intermeshing with upper and lower gears of a supply reel while interacting with the intermediate lever, during the high speed winding mode.

13. The apparatus of claim 9, wherein the tension arm includes an engaging jaw for locking an engaging pin of the intermediate lever therein during the high speed winding mode.

* * * * *